Figure 1:
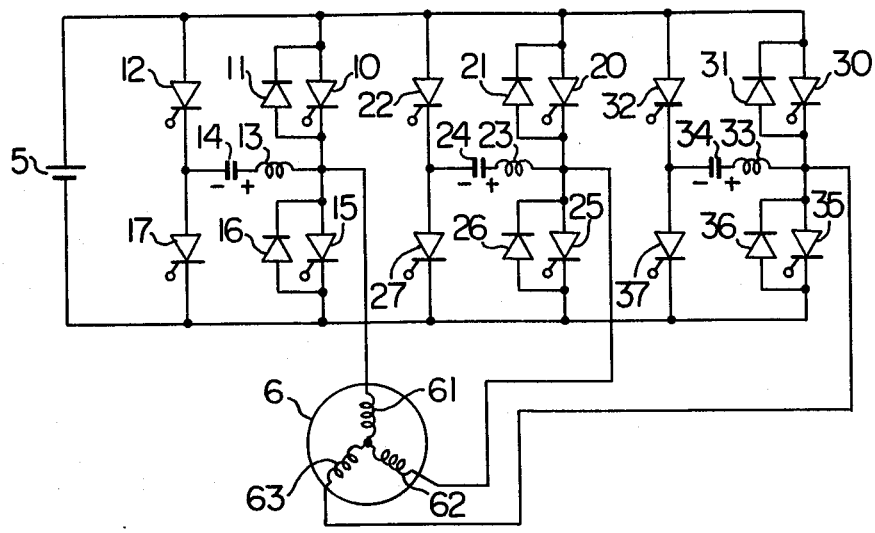

United States Patent [19]

Tamura et al.

[11] 4,455,599

[45] Jun. 19, 1984

[54] PULSE WIDTH MODULATION INVERTER

[75] Inventors: Kaoru Tamura; Hidetoshi Aizawa, both of Hitachi, Japan

[73] Assignee: Hitachi, Ltd., Tokyo, Japan

[21] Appl. No.: 365,598

[22] Filed: Apr. 5, 1982

[30] Foreign Application Priority Data

Apr. 8, 1981 [JP] Japan .................................. 56-51823

[51] Int. Cl.³ .............................................. H02M 1/06
[52] U.S. Cl. ...................................... 363/138; 363/58; 363/96
[58] Field of Search ..................................... 363/55–58, 363/96, 135–138; 307/252 R, 252 K, 252 M, 252 P; 318/798, 801–802, 806–807, 810–811, 430, 431, 434

[56] References Cited

U.S. PATENT DOCUMENTS

| | | | |
|---|---|---|---|
| 3,656,047 | 4/1972 | Yarema et al. | 363/138 |
| 3,701,001 | 10/1972 | Reiss et al. | 363/138 |
| 3,718,853 | 2/1973 | Graf | 363/58 |
| 3,939,392 | 2/1976 | Chalmers et al. | 363/96 |

Primary Examiner—Peter S. Wong
Attorney, Agent, or Firm—Antonelli, Terry & Wands

[57] ABSTRACT

A pulse width modulation inverter loaded with a three-phase AC motor is halted when a logical condition exists that a halt signal has been given and all of pulse width modulation signals applied to either three positive side or three negative side main thyristors in a three-phase bridge connection constituting the inverter are in their high level states.

4 Claims, 12 Drawing Figures

PULSE WIDTH MODULATION INVERTER

The present invention relates to a method of halting a pulse width modulation (PWM) inverter, and particularly to a method of halting a PWM inverter which is preferably loaded with a three-phase alternating current (AC) motor.

Inverter main circuits having six main thyristors arranged in a three-phase bridge connection, typically include commutating diodes which are each in an inverse-parallel connection with the corresponding main thyristor, and forced commutation circuits for commutating the main thyristors forcedly. Each of the forced commutation cicuits can include an auxiliary thyristor, a commutating inductor and a commutating capacitor connected with the corresponding main thyristor. In such inverter main circuits it is general to design the circuit such that the commutating capacitors are charged to have the same polarity each time the inverter has halted so that the inverter can be restarted with a simple starting logic. Therefore, in such a PWM inverter there may be one or more main thyristors which cannot be turned off immediately in response to an inverter halting signal for turning off the main thyristors because the charging polarity of the commutating capacitors must be made same, as will be described in detail later. This can possibly result in a temporary short-circuit mode in the three-phase bridge connection constituting the inverter depending on the state of the PWM signals applied to the main thyristors, causing the AC motor to produce an unbalanced torque. This unbalanced torque gives rise to an abnormal mechanical force on the drive shaft of the AC motor, and therefore it must be prevented. The larger the capacity if the AC motor, the larger the unbalanced torque which tends to be produced. Therefore, it is particularly important to prevent such a pheromena in driving a large capacity motor by the PWM inverter. However, prior art technologies for solving the occurrence of such an unbalanced torque have not been disclosed Accordingly, it is an object of the present invention to provide a method of halting a PWM inverter without causing a short-circuit mode in the three-phase bridge connection constituting the inverter.

Briefly, according to the present invention, when a command signal for halting the inverter is given, the main thyristors are not turned off immediately. Instead, they are turned off at a time when all of the PWM signals applied to the three "positive side or negative side" main thyristors in three-phase bridge connection are placed in a high level state. There are two cases, turning off the "positive side" main thyristors and turning off the "negative side" main thyristors, depending on the charging polarity of the commutating capacitors. With such an arrangement, the inverter can be halted with the commutating capacitors having the same polarity and, moreover, all of the main thyristors are turned off, causing no short-circuit mode in the three-phase bridge connection constituting the inverter. Consequently, the AC motor does not produce an unbalanced torque and the motor can be deenergized safely.

Figure 2:
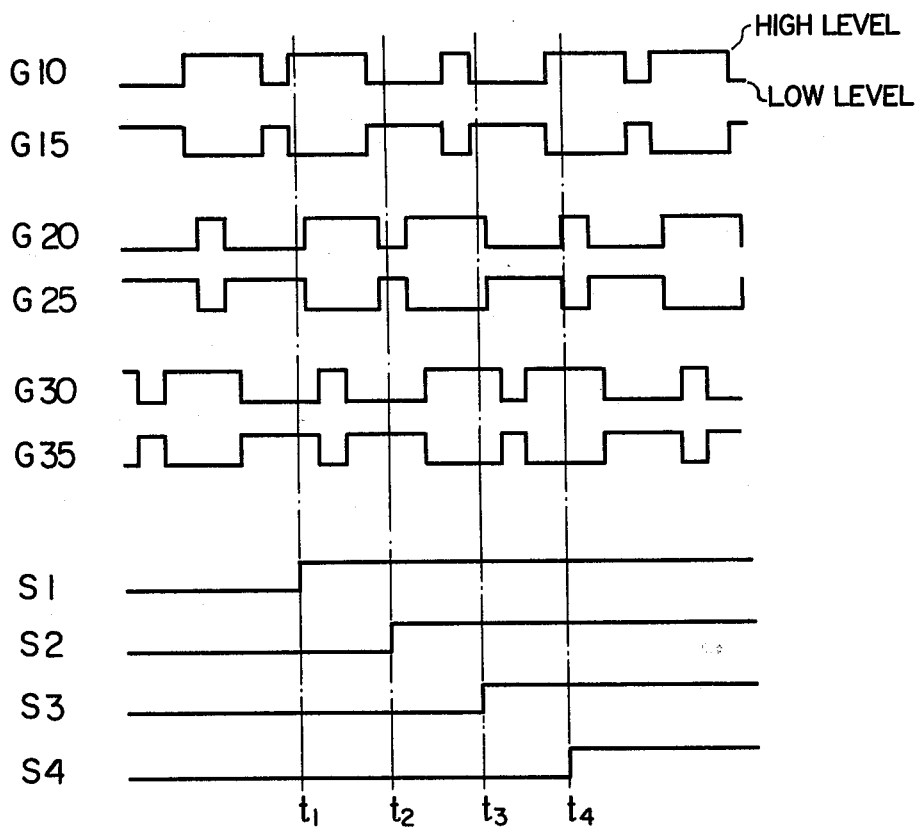
Figure 3A:
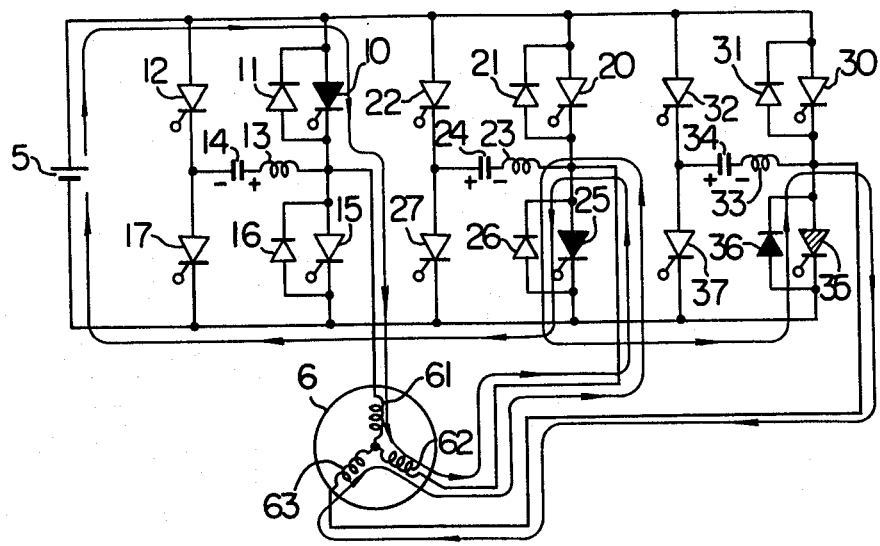
Figure 3B:
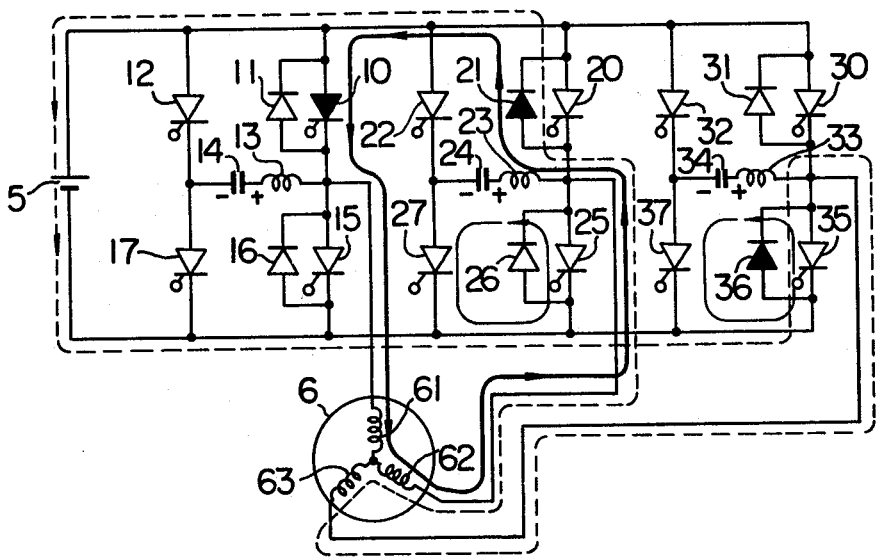
Figure 4A:
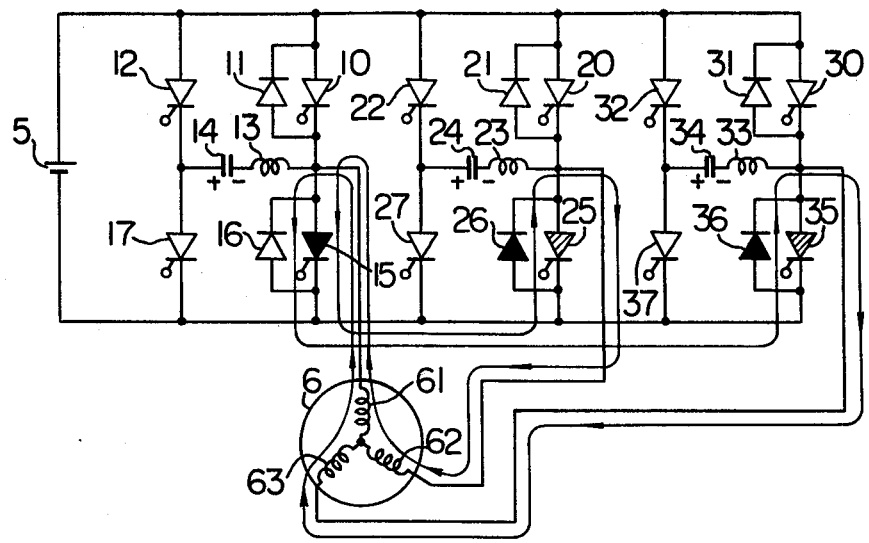
Figure 4B:
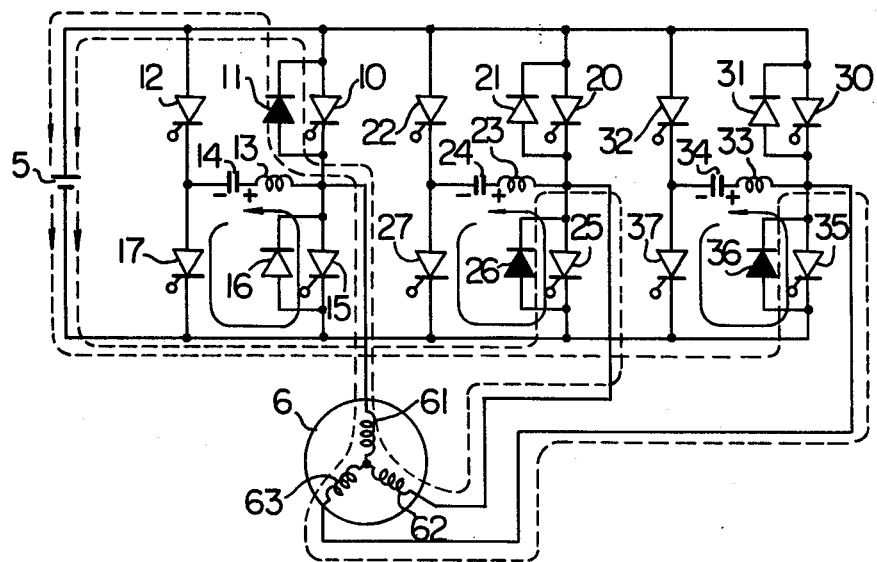
Figure 5:
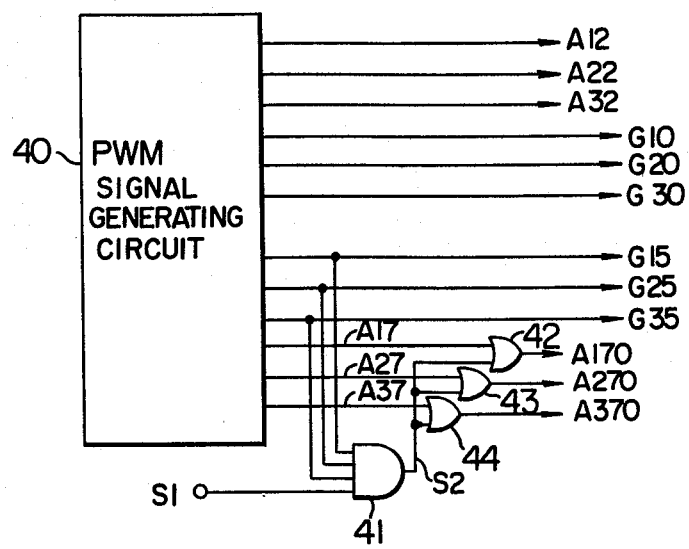
Figure 8:
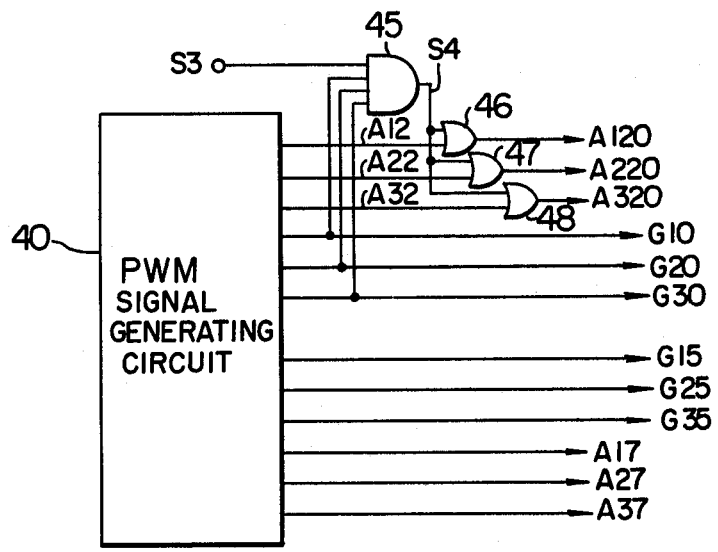

FIG. 1 is a schematic diagram of the inverter main circuit to which the present invention is applied; FIG. 2 is a set of waveform charts for the PWM signals and the halting signals applied to the inverter shown in FIG. 1; FIGS. 3A and 3B, and 6A and 6B are illustrations explaining the prior art method of halting the inverter; FIGS. 4A and 4B, and 7A and 7B are illustrations explaining the method of halting the inverter according to the present invention; and FIGS. 5 and 8 are circuit diagrams showing a logic circuit accomplishing the present invention.

FIG. 1 shows an inverter main circuit useful to explain the present invention, in which there are six main thyristors 10, 15, 20, 25, 30 and 35 arranged in three-phase bridge connection with commutating diodes 11, 16, 21, 26, 31 and 36 inversely parallelly connected to the main thyristors, respectively. Auxiliary thyristors 12, 17, 22, 27, 32 and 37, and commutating capacitors 14, 24 and 34 constitute forced commutating circuits for commutating respective main thyristors. The direct current (DC) side of the three-phase bridge connection is connected to a DC power source 5, while the AC side is connected to primary windings 61, 62 and 63 of an AC motor 6. The operation of inverters of this type is well known in the art and the explanation thereof is omitted. In the following discussion, the inverter shown in FIG. 1 is arranged to halt the operation with the commutating capacitors 14, 24 and 34 having a charging polarity as shown in the figure. This makes the restarting of the inverter easy merely by provision of a starting logic such that the starting operation is initiated when the main thyristors 10, 20 and 30 receive the PWM signals simultaneously.

FIG. 2 shows the PWM signals and the inverter halting signals applied to the main thyristors, and these signals have two states, i.e. a high level state and a low level state. In FIG. 2, PWM signals G10, G15, G20, G25, G30 and G35 are applied to the main thyristors 10, 15, 20, 25, 30 and 35, respectively. Each main thyristor becomes conductive when the PWM signal is in the high level and nonconductive when it is in the low level. There is a phase difference of 180° between the thyristors G10 and G15, G20 and G25, and G30 and G35. S1–S4 in FIG. 2 designate inverter halting signals during their high levels.

The conventional method for halting the inverter will first be described. An inverter halting signal S1 is issued at time t1 in FIG. 2 and the main thyristors of the inverter are turned off immediately. FIG. 3A shows the conduction states of the main thyristors and commutating diodes at time t1 of FIG. 2. At time t1, the main thyristors 10, 25 and 35 receive respective high level PWM signals, which during these thyristors into their conductive state, and the main thyristors 10 and 25 and the commutating diode 36 conduct a current. Accordingly, a current flows through two paths "5-10-61-62-25-5" and "63-62-25-36-63". Thus, if the halt signal S1 is applied at time t1, in order to halt the inverter, the auxiliary thyristors 27 and 37 are turned on, causing the main thyristors 25 and 35 to turn off due to the inverse charging current for the capacitors 24 and 34 through commutating circuits "24-27-25-23-24" and "34-37-35-33-34", whereas the commutating capacitor 14 has been charged in a polarity which is expected when the inverter restarts and hence an inverse charging current cannot flow through a commutating circuit "14-13-10-12-14", causing the main thyristor 10 to remain conductive. Therefore, the current intends to flow through two new paths "5-36-63-62-21-5" and "61-62-21-10-61" as shown in FIG. 3B. The former path opposes the DC power source 5 in polarity, and the current actually flows only through the latter path. The latter current path "61-62-21-10-61" creates a short-circuit mode in the three-phase bridge connection, causing the AC motor 6 to produce the unbalanced torque.

The above-mentioned short-circuit mode is not created according to the present invention, the reason for which will be apparent from the following description. FIGS. 4A and 4B show the inverter halting method according to an embodiment of the present invention. In this embodiment, the main thyristors are not turned off immediately upon receipt of the inverter halting signal S1. Instead they are turned off at time t2 shown in FIG. 2. FIG. 4A shows the conduction states of the main thyristors and commutating diodes at time t2. At time t2, the main thyristors 15, 25 and 35 receive respective high level PWM signals, which bring these thyristors conductive, and the main thyristor 15 and the commutating diodes 26 and 36 conduct a current. Accordingly, a current flows through two paths, "62-61-15-26-62" and "63-61-15-36-63". Thus, when a halt signal S2 is issued at time t2 of FIG. 2, the auxiliary thyristors 17, 27 and 37 are turned on, in order to halt the inverter. Then, inverse charging currents for the commutating capacitors 14, 24 and 34 flow through commutating circuits "14-17-15-13-14", "24-27-25-23-24" and "34-37-35-33-34", causing all of the main thyristors 15, 25 and 35 to turn off. Consequently, the current intends to flow through two new paths, "5-26-62-61-11-5" and "5-36-63-61-11-5". However, both paths oppose the DC power source 5 in polarity and no current actually flows. Therefore, a short-circuit mode is not created in the three-phase bridge connection according to the present invention and the AC motor 6 does not produce an unbalanced torque. Further, the commutating capacitors are all charged in a polarity which is expected when the inverter restarts, and thus the inverter can be restarted smoothly.

FIG. 5 shows a logic circuit for effecting the halting method shown in FIGS. 4A and 4B. A PWM signal generating circuit 40, which is well known in the art, delivers PWM signals G10, G20, G30, G15, G25 and G35 for respective main thyristors, and firing signals A12, A22, A32, A17, A27 and A37 for respective auxiliary thyristors. An AND gate 41 takes the logical product between the inverter halting signal S1 and the PWM signals G15, G25 and G35 and produces at its output the halting signal S2. OR gates 42, 43 and 44 take the logical product between the halt signal S2 and the firing signals A17, A27 and A37 for the auxiliary thyristors 17, 27 and 37, respectively, and their outputs A170, A270 and A370 are used to turn on the auxiliary thyristors 17, 27 and 37, respectively, thereby turning off the main thyristors 15, 25 and 35.

The inverter halting operation as opposed to that shown in FIGS. 3A, 3B, 4A and 4B will be described with reference to FIGS. 6A and 6B, and 7A and 7B. These Figures show halting of the inverter with the opposite charging polarity of the commutating capacitors 14, 24 and 34 to those shown in FIG. 1.

Figure 6A:
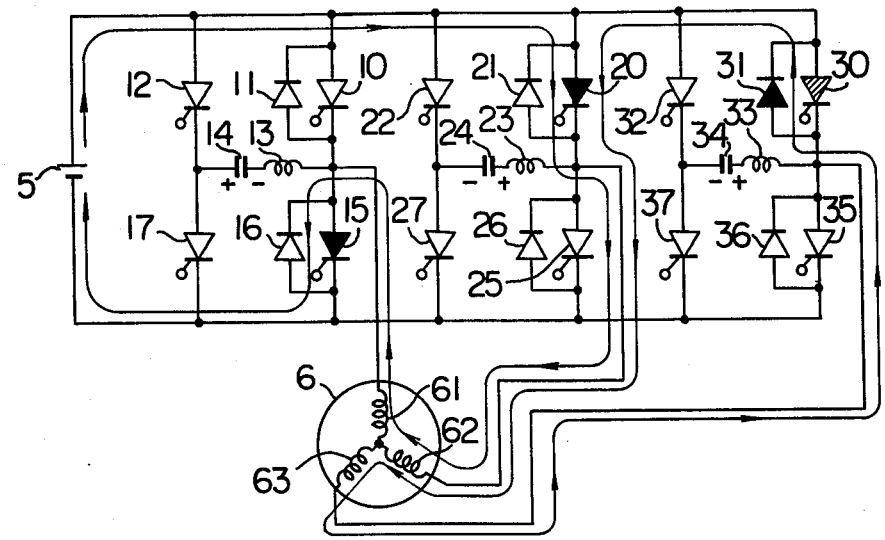
Figure 6B:
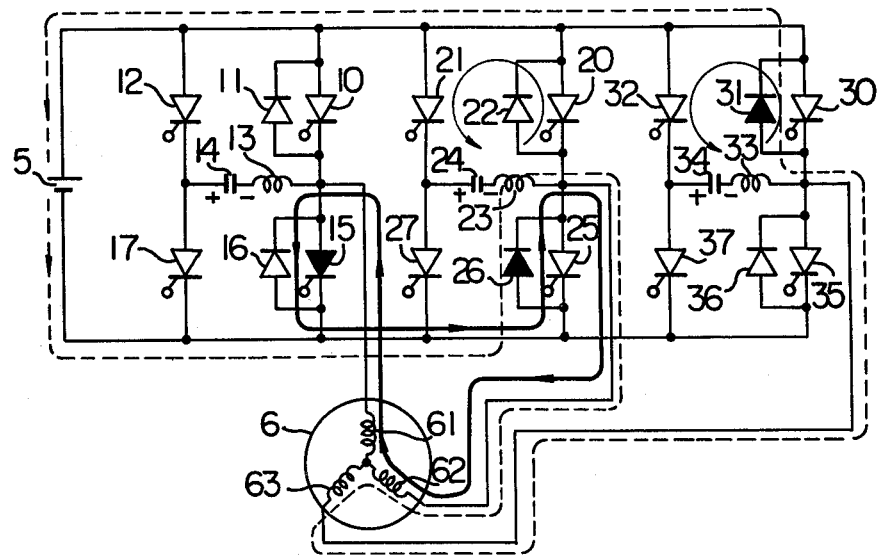

The conventional method for halting the inverter will first be described, in which an inverter halting signal S3 is issued at time t3 and the main thyristors are turned off immediately. FIG. 6A shows the conduction states of the main thyristors and commutating diodes at time t3. At time t3, the main thyristors 15, 20 and 30 receive respective high level PWM signals, which bring these thyristors into their conductive state, and the main thyristors 15 and 20 and the commutating diode 31 conduct a current. Accordingly, a current flows through two paths, "5-20-62-61-15-5" and "62-63-31-20-62". Thus, when the halt signal S3 is issued at time t3, in order to halt the inverter, the auxiliary thyristors 22 and 32 are turned on, and then the inverse charging current for the commutating capacitors flows through commutating circuits "24-23-20-22-24" and "34-33-30-32-34", whereby the main thyristors 20 and 30 are turned off. However, the commutating capacitor 14 has already been charged in a polarity which is expected when the inverter restarts and hence an inverse current cannot flow through a commutating circuit "14-17-15-13-14", so that the main thyristor 15 is maintained in the conductive state. Therefore, the current intends to flow through two new paths, "5-26-62-63-31-5" and "62-61-15-26-62", as shown in FIG. 6B. However, the former current path opposes the DC power source 5 in polarity and the current actually flows only through the latter path. The latter current path "62-61-15-26-62" creates a short-circuit mode in the three-phase bridge connection as in the case of FIG. 3B, causing the AC motor to produce the unbalanced torque.

Figure 7A:
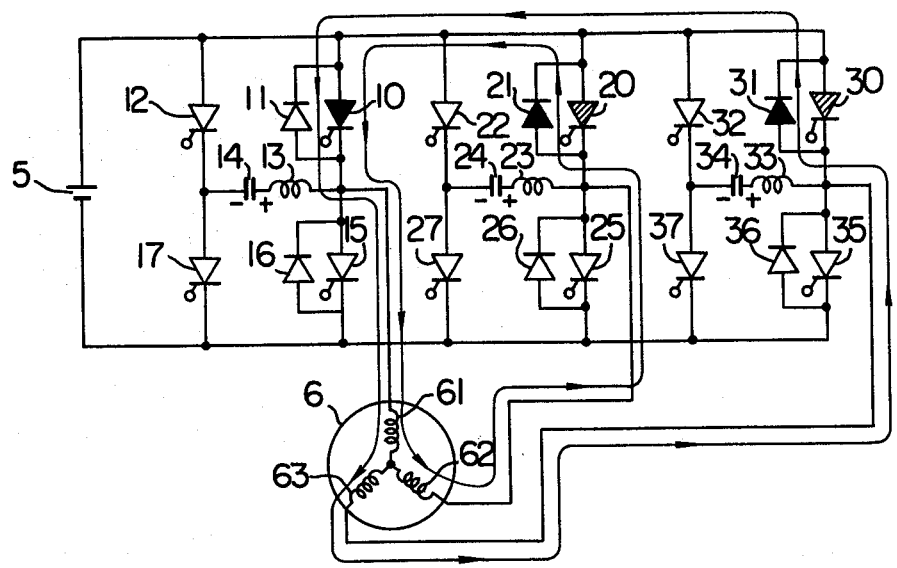
Figure 7B:
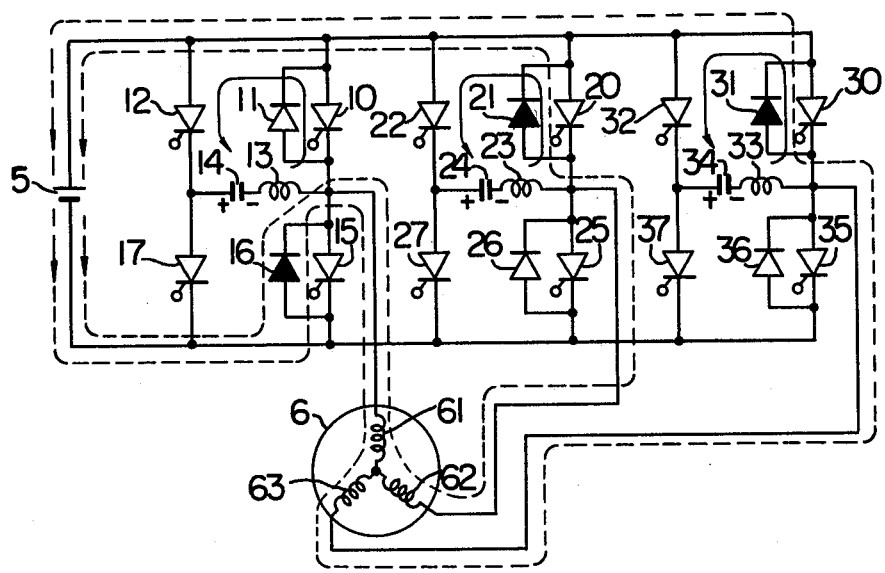

By use of the inverter halting method according to an embodiment of the present invention as shown in FIGS. 7A and 7B, such a short-circuit mode is not created for the following reason. According to this embodiment, the main thyristors are not turned off immediately upon receipt of the inverter halting signal S3, but instead they are turned off at time t4 shown in FIG. 2. FIG. 7A shows the conduction states of the main thyristors and commutating diodes at time t4. At time t4, the main thyristors 10, 20 and 30 receive respective high level PWM signals, which bring these thyristors into a conductive, state and the main thyristor 10 and commutating diodes 21 and 31 conduct a current. Accordingly, a current flows through two paths, "61-62-21-10-61" and "61-63-31-10-61". When the halt signal S4 is issued at time t4 of FIG. 2, in order to halt the inverter, the auxiliary thyristors 12, 22 and 32 are turned on, and then the inverse charging current for the commutating capacitors 14, 24 and 34 flows through commutating circuits "14-13-10-12-14", "24-23-20-22-24" and "34-33-30-32-34", whereby all of the main thyristors 10, 20 and 30 are turned off. Thus, the current intends to flow through two new paths, "5-16-61-62-21-5" and "5-16-61-63-31-5". However, both paths oppose the DC power source 5 in polarity, and the current does not actually flow. Thus, this embodiment also does not create a short-circuit mode in the three-phase bridge connection as in the case of FIG. 4B, and the AC motor 6 does not produce the unbalanced torque. Further, all of the commutating capacitors are charged in a polarity which is expected when the inverter restarts, whereby the inverter can be restarted smoothly.

FIG. 8, which is similar to FIG. 5, shows a logic circuit for effecting the halting method shown in FIGS. 7A and 7B. The logic circuit of FIG. 8 differs from that of FIG. 5 in that the arrangement of FIG. 8 detects the time point at which all PWM signals applied to three positive side main thyristors 10, 20 and 30 become high, whereas the arrangement of FIG. 5 detects the time point at which all PWM signals applied to three negative side main thyristors 15, 25 and 35 become high. In FIG. 8, the AND gate 45 takes the logical product between the inverter halting signal S3 and the PWM signals G10, G20 and G30 to produce the halting signal S4. The OR gates 46, 47 and 48 take logical product between the halt signal S4 and firing signals A12, A22 and A32 for the auxiliary thyristors 12, 22 and 32, respectively, and their outputs A120, A220 and A320 are used to turn on the auxiliary thryristors 12, 22 and 32, thereby turning off the main thrysitors 10, 20 and 30, respectively. Either of the logic circuits shown in FIGS. 5 and 8 is selected depending on the charging polarity of the commutating capacitors at the time of halting and hence restarting the inverter.

In the above description of the embodiments, the main thyristors and commutating diodes are assumed to be individual semiconductor devices, however, each pair of the main thyristor and commutating diode may be replaced by a reverse-conducing triode thyristor made up of a thyristor and a diode in an inverse-parallel connection fabricated on one semiconductor body.

We claim:

1. A method of halting a pulse width modulation inverter in which an inverter main circuit comprising six main thyristors arranged in a three-phase bridge connection, commutating diodes each arranged in an inverse-parallel connection with a corresponding one of said main thyristors, and forced commutation circuits for cummutating the main thyristors forcedly, each said forced commutation circuit comprising an auxiliary thyristor, a commutating inductor and a commutating capacitor, connected with a corresponding one of said main thyristors, is controlled by pulse width modulation signals, wherein, at a time when it is determined that a logical condition exists that all inverter halting signals and pulse width modulation signals applied to three positive side or three negative side main thyristors of said six main thyristors arranged in the three-phase bridge connection are in their high level states, the application of all of said pulse width modulation signals to said main thyristors is stopped so that said positive side or negative side main thyristors in their conduction states are forcedly commutated to halt said inverter.

2. A method of halting an inverter according to claim 1, wherein each pair of said main thyristor and said commutating diode is made up of a reverse-conducting triode thyristor.

3. A method of halting a pulse width modulation inverter which inverter comprises six main thyristors arranged in a three-phase bridge connection with three of said main thyristors being positive side main thyristors and the other three of said six main thyristors being negative side main thyristors, commutating diodes each arranged in an inverse-parallel connection with a corresponding one of said main thyristors, and forced commutating circuits for commutating the main thyristors forcedly, each said forced commutation circuit comprising an auxiliary thyristor, a commutating inductor and a commutating capacitor, connected with a corresponding one of said main thyristors, said method comprising:

applying pulse width modulation signals to said main thyristors to control the operation of said inverter main circuit logically determining when a condition exists wherein an inverting halting signal has a predetermined level corresponding to an order to halt the inverter and the pulse width modulation signals applied to said three positive side main thyristors are all in their high level state; and applying firing signals to auxiliary thyristors connected to said three positive side main thyristors to forcedly commutate said three positive side main thyristors only when said logically determined condition exists to thereby halt said inverter following the logical determination of the existence of said condition.

4. A method of halting a pulse width modulation inverter which inverter comprises six main thyristors arranged in a three-phase bridge connection with three of said main thyristors being positive side main thyristors and the other three of said six main thyristors being negative side main thyristors, commutating diodes each arranged in an inverse-parallel connection with a corresponding one of said main thyristors, and forced commutating circuits for commutating the main thyristors forcedly, each said forced commutation circuit comprising an auxiliary thyristor, a commutating inductor and a commutating capacitor, connected with a corresponding one of said main thyristors, said method comprising:

applying pulse width modulation signals to said main thyristors to control the operation of said inverter main circuit;

logically determining when a condition exists wherein an inverting halting signal has a predetermined level corresponding to an order to halt the inverter and the pulse width modulation signals applied to said three negative side main thyristors are all in their high level state; and applying firing signals to auxiliary thyristors connected to said three negative side main thyristors to forcedly commutate said three negative side main thyristors only when said logically determined condition exists to thereby halt said inverter following the logical determination of the existence of said condition.

* * * * *